United States Patent
Park et al.

(10) Patent No.: US 12,486,369 B2
(45) Date of Patent: Dec. 2, 2025

(54) POLYIMIDE-BASED FILM HAVING EXCELLENT SURFACE EVENNESS AND METHOD FOR PRODUCING SAME

(71) Applicant: KOLON INDUSTRIES, INC., Seoul (KR)

(72) Inventors: Hyo Jun Park, Seoul (KR); Jong Won Yang, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 933 days.

(21) Appl. No.: 17/760,759

(22) PCT Filed: Sep. 14, 2020

(86) PCT No.: PCT/KR2020/012351
§ 371 (c)(1),
(2) Date: Mar. 15, 2022

(87) PCT Pub. No.: WO2021/060752
PCT Pub. Date: Apr. 1, 2021

(65) Prior Publication Data
US 2022/0340724 A1     Oct. 27, 2022

(30) Foreign Application Priority Data

Sep. 27, 2019 (KR) .......... 10-2019-0119681
Jul. 1, 2020 (KR) .......... 10-2020-0080938

(51) Int. Cl.
*C08J 5/18* (2006.01)
*C08G 73/10* (2006.01)

(52) U.S. Cl.
CPC ............ *C08J 5/18* (2013.01); *C08G 73/1078* (2013.01); *C08J 2379/08* (2013.01)

(58) Field of Classification Search
CPC .................................................. C08G 73/1078
See application file for complete search history.

(56) References Cited

U.S. PATENT DOCUMENTS

| 2013/0323485 | A1  | 12/2013 | Shimizu |
| 2016/0009882 | A1  | 1/2016  | Yoon |
| 2018/0355108 | A1* | 12/2018 | Jo ........................ C09D 179/08 |

FOREIGN PATENT DOCUMENTS

| JP | 2001162635 A | 6/2001 |
| JP | 2004046068 A | 2/2004 |
| JP | 2006143839 A | 6/2006 |
| JP | 2006199740 A | 8/2006 |
| JP | 2008259983 A | 10/2008 |
| JP | 2013203838 A | 10/2013 |
| JP | 2019002001 A | 1/2019 |
| KR | 101229161 B1 | 2/2013 |

(Continued)

OTHER PUBLICATIONS

The office action dated Mar. 8, 2023 related to the corresponding Japanese Patent application.

(Continued)

*Primary Examiner* — Megan McCulley
(74) *Attorney, Agent, or Firm* — Harvest IP Law, LLP

(57) ABSTRACT

Disclosed are a polyimide-based film and a method of producing the same, and more particularly, a polyimide-based film having excellent surface evenness and suppressed waviness due to low Kc of 1.55 or less and a method of producing the same.

16 Claims, 3 Drawing Sheets

(56) References Cited

FOREIGN PATENT DOCUMENTS

| KR | 101756714 B1 | 7/2017 |
| KR | 1020180134772 A | 12/2018 |
| KR | 20190084757 A | 7/2019 |
| TW | 201922866 A | 6/2019 |
| WO | 2016010003 A1 | 1/2016 |
| WO | 2017175869 A1 | 10/2017 |

OTHER PUBLICATIONS

Ismail Mostafa Y et al: Surface . . . topography.
The office action dated Jul. 26, 2024, related to the corresponding European Patent application.
The office action dated Aug. 11, 2023 related to the corresponding Korean Patent application.

\* cited by examiner

POLYIMIDE-BASED FILM HAVING EXCELLENT SURFACE EVENNESS AND METHOD FOR PRODUCING SAME

CROSS REFERENCE TO RELATED APPLICATIONS

This application is a National Stage of International Application No. PCT/KR2020/012351 filed Sep. 14, 2020, claiming priority to Korean Patent Application No. 10-2019-0119681 filed Sep. 27, 2019 and Korean Patent Application No. 10-2020-0080938 filed Jul. 1, 2020, the disclosures of which are incorporated herein by reference in its entirety.

TECHNICAL FIELD

The present disclosure relates to a polyimide-based film having excellent surface evenness, a method of producing the same and an electronic device, and more particularly to a polyimide-based film having suppressed waviness due to low Kc, a method of producing the same and an electronic device.

BACKGROUND ART

Polyimide (PI)-based resins have properties such as high heat resistance, oxidation resistance, radiation resistance, low-temperature resistance and chemical resistance, and are thus widely used in electronic products, semiconductors, automobiles, aircraft, spacecraft and the like, and are used as transparent electrode films as well as cover windows for display devices.

Recently, studies have been conducted to improve the optical properties of polyimide-based resins, and polyimide-based resins having excellent optical properties are being developed without great deterioration in mechanical properties or thermal properties thereof.

Polyimide-based films produced from polyimide-based resins having excellent mechanical properties, thermal properties and optical properties are used in various flexible products, and studies are being conducted on the use thereof as substitutes for glass. For example, studies are being conducted on the use of polyimide-based films as cover windows or protective materials for display devices.

DISCLOSURE

Technical Problem

Therefore, it is one object of the present disclosure to provide a polyimide (PI)-based film having excellent surface evenness.

It is another object of the present disclosure to provide a polyimide (PI)-based film capable of suppressing the occurrence of waviness and having excellent surface evenness due to the low Kc value thereof.

It is another object of the present disclosure to provide a method of producing a polyimide (PI)-based film having excellent surface evenness.

It is another object of the present disclosure to provide a method of producing a polyimide (PI)-based film having a low Kc value through control of drying conditions.

It is another object of the present disclosure to provide a method of producing a polyimide (PI)-based film capable of suppressing the occurrence of waviness.

It is another object of the present disclosure to provide an electronic device including the polyimide (PI)-based film having excellent surface evenness due to the low Kc value thereof.

Technical Solution

In accordance with one aspect of the present disclosure to solve the technical problems, provided is a polyimide-based film having a Kc value of 1.55 or less, wherein the Kc value is a curvature parameter measured for a waviness having a wavelength range of 1.0 to 3.0 mm by phase stepped deflectometry (PSD).

The polyimide-based film may have a Kc value of 1.45 or less.

The polyimide-based film may have a Kc value of 1.10 to 1.45.

The polyimide-based film may be produced from monomer components including dianhydride and diamine.

The dianhydride may include at least one selected from 2,2-bis(3,4-dicarboxyphenyl)hexafluoropropane dianhydride (6FDA), 3,3',4,4'-biphenyl tetracarboxylic dianhydride (BPDA), 4-(2,5-dioxotetrahydrofuran-3-yl)-1,2,3,4-tetrahydronaphthalene-1,2-dicarboxylic anhydride (TDA), pyromellitic dianhydride (PMDA), 3,3',4,4'-benzophenone tetracarboxylic dianhydride (BTDA), 4,4'-oxydiphthalic anhydride (ODPA), 4,4'-(3,4-bisdicarboxyphenoxy-diphenyl sulfide dianhydride (BDSDA), 3,3',4,4'-diphenylsulfonetetracarboxylic dianhydride ($SO_2$DPA), 4,4'-(4,4'-Isopropylidenediphenoxy)bis(phthalic anhydride) (6HBDA), cyclobutane-1,2,3,4-tetracarboxylic dianhydride (CBDA), 1,2,3,4-cyclopentane-tetracarboxylic dianhydride (CPDA), 1,2,4,5-Cyclohexanetetracarboxylic Dianhydride (CHDA), and dicyclohexyl-3,4,3',4'-tetracarboxylic dianhydride (HBPDA).

The diamine may include at least one selected from 3,4-oxydianiline (34ODA), 4,4'-oxydianiline (4ODA), p-phenylenediamine (pPDA), m-phenylenediamine (mPDA), 4,4-methylenedianiline (pMDA), 3,3-methylenedianiline (mMDA), 1,3-Bis(3-aminophenoxy)benzene (133APB), 1,3-Bis(4-aminophenoxy)benzene (134APB), 2,2'-bis[4-(4-aminophenoxy) phenyl] hexafluoropropane (4BDAF), 2,2'-bis(3-aminophenyl)hexafluoropropane (33-6F), 2,2'-bis(4-aminophenyl)hexafluoropropane (44-6F), bis(4-aminophenyl)sulfone (4DDS), bis(3-aminophenyl) sulfone (3DDS), 2,2'-bis(trifluoromethyl)benzidine (TFDB), 1,3-cyclohexanediamine (13CHD), 1,4-cyclohexanediamine (14CHD), 2,2-bis[4-(4-aminophenoxy)phenyl]propane (6HMDA), 2,2-bis(3-amino-4-hydroxyphenyl)hexafluoropropane (DBOH), bis[4-(4-aminophenoxy)phenyl] sulfone, bis[4-(3-aminophenoxy)phenyl] sulfone, 9,9-bis(4-aminophenyl)fluorene (FDA) and 9,9-bis(4-amino-3-fluorophenyl)fluorene (F-FDA).

The monomer components may further include a dicarbonyl compound.

The dicarbonyl compound may include at least one of an aromatic dicarbonyl compound and an aliphatic dicarbonyl compound.

The aromatic dicarbonyl compound may be represented by the following Formula 1:

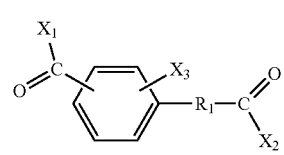

[Formula 1]

wherein $R_1$ represents a single bond, *—Ar—*, *—O—Ar—*, *-CAL-*, or *—O-CAL-*, $X_1$ and $X_2$ each independently represent hydrogen, a hydroxy group (OH) or a halogen element, and $X_3$ represents hydrogen or a halogen element, wherein "Ar" represents a substituted or unsubstituted arylene group, and "CAL" represents a cycloaliphatic group.

The aromatic dicarbonyl compound may include at least one of a compound represented by the following Formula 3, a compound represented by the following Formula 4, a compound represented by the following Formula 5, a compound represented by the following Formula 6, a compound represented by the following Formula 7, a compound represented by the following Formula 8 and a compound represented by the following Formula 9.

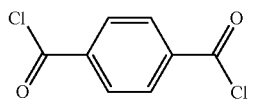

[Formula 3]

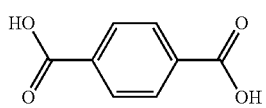

[Formula 4]

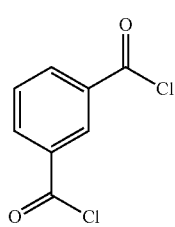

[Formula 5]

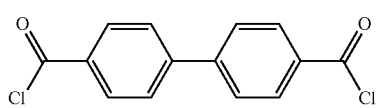

[Formula 6]

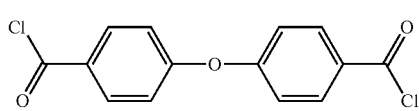

[Formula 7]

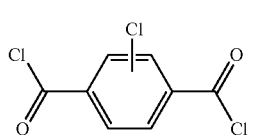

[Formula 8]

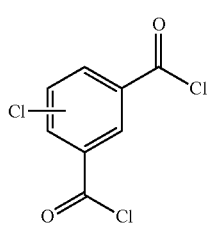

[Formula 9]

The aliphatic dicarbonyl compound may include at least one of a compound represented by the following Formula 10, a compound represented by the following Formula 11, a compound represented by the following Formula 12, and a compound represented by the following Formula 13.

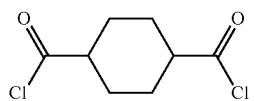

[Formula 10]

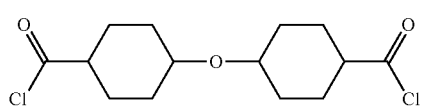

[Formula 11]

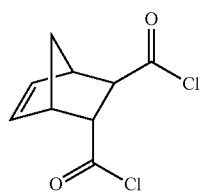

[Formula 12]

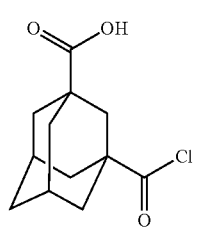

[Formula 13]

Based on a thickness of 80 μm, the polyimide-based film may have a haze of 2.0 or less, an average optical transmittance of 87% or more at a wavelength of 380 to 780 nm, and a yellow index of 5 or less.

In accordance with another aspect of the present disclosure, provided is a method of producing a polyimide-based film including preparing a liquid resin composition using monomer components including dianhydride and diamine, producing a gel-type film using the liquid resin composition, and first drying the gel-type film at 50 to 150° C. at a wind speed of 1.0 m/s or less for 2 to 20 minutes, wherein, in the first drying, the drying coefficient conditions according to the following Equations 1 and 2 are satisfied when a drying temperature is A° C., a wind speed is B m/s and a first drying period is T minutes.

$$0.5 \leq [(A-40) \times B \times T]/100 \leq 10 \quad \text{[Equation 1]}$$

$$2 \leq [(A-40) \times T]/100 \leq 10 \quad \text{[Equation 2]}$$

The monomer components may further include a dicarbonyl compound.

The liquid resin composition may have a viscosity of 1,000 to 250,000 cPs.

The method of producing the polyimide-based film may further include second drying the gel-type film at a wind speed of 1.0 to 5.0 m/s at 70 to 140° C. after the first drying.

The method of producing the polyimide-based film may further include first heat-treating the gel-type film for 1 minute to 1 hour at a temperature of 100 to 500° C. after the second drying.

The producing the gel-type film may include casting the liquid resin composition on a support.

The preparing the liquid resin composition may include reacting the monomer components in a presence of a first solvent to prepare a first polymer solution, adding a second solvent to the first polymer solution, followed by filtering and drying, to prepare a polymer solid, and dissolving the polymer solid in a third solvent.

In accordance with another aspect of the present disclosure, provided is a polyimide-based film produced according to the method as described above.

In accordance with another aspect of the present disclosure, provided is an electronic device including the polyimide-based film.

Advantageous Effects

According to an embodiment of the present disclosure, a polyimide-based film having a low Kc value can be produced by controlling the drying conditions in the process of producing the polyimide-based film. The polyimide-based film according to an embodiment of the present disclosure has a low Kc value and can suppress the generation of waviness and thus can exhibit excellent surface evenness.

A polyimide-based film having a low Kc value and excellent surface evenness produced according to an embodiment of the present disclosure has glass-like surface properties and thus can be used as a substitute for glass.

BEST MODE

Figure 1:
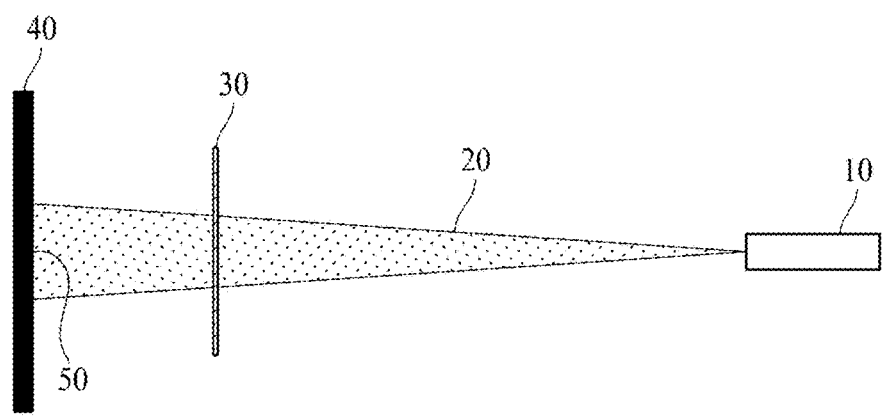
FIG. 1 is a schematic diagram illustrating a method of projecting an image of a film.

Hereinafter, preferred embodiments of the present disclosure will be described in more detail with reference to the annexed drawings. These embodiments are provided for illustration so that this disclosure will be thorough and complete, and should not be construed as limiting the scope of the present disclosure.

The shapes, sizes, ratios, angles, numbers, etc. disclosed in the drawings for describing the embodiments of the present disclosure are exemplary and thus the present disclosure is not limited to the items shown in the drawings. Like reference numbers refer to like elements throughout the description of the figures. Detailed descriptions of related well-known technologies may be omitted when these may unnecessarily make the subject matter of the present disclosure unclear.

When the terms "include", "have", and "consist of", etc. mentioned herein are used, another element may be added, unless the expression "only" is used. Singular forms are intended to include plural forms as well, unless the context clearly indicates otherwise. In addition, constituent elements are to be interpreted as including error ranges even if there is no explicit description thereof.

In the description of positional relationship, for example, when the positional relationship between the two elements is described using "on", "upper", "lower", and "next to", at least one other element may be present between the two elements, unless the term "immediately" or "directly" is used.

Spatially relative terms such as "below", "beneath", "lower", "above" and "upper" may be used herein to easily describe one element's relationship to another element as illustrated in the figures. It will be understood that spatially relative terms are intended to encompass different orientations of the device in addition to the orientation depicted in the figures. For example, if the device in one of the figures is turned over, elements described as "below" or "beneath" other elements would then be oriented "above" the other elements. The exemplary terms "below" or "beneath" can, therefore, encompass both an orientation of above and below. Likewise, the exemplary terms "up" or "above" may include both an upward and downward direction.

In the description of a temporal relationship, for example, when a temporal sequence relationship is described using "after", "following", "before", etc., it may also include cases that are non-continuous, unless the term "right" or "direct" is used.

It will be understood that, although the terms "first", "second", etc. may be used herein to describe various elements, these elements should not be construed to be limited by these terms, which are used only to distinguish one element from another. Accordingly, a first component mentioned below may alternatively be referred to as a second component without exceeding the technical idea of the present disclosure.

The term "at least one" should be understood as including all possible combinations from one or more related items. For example, "at least one of a first item, a second item and a third item" may mean each of the first item, the second item, and the third item, as well as a combination of all items that can be derived from two or more of the first item, the second item, and the third item.

Respective features of the various embodiments of the present disclosure can be partially or entirely combined with each other and can be technically interlocked and driven in various ways, and the respective embodiments may be implemented independently with respect to each other or together in an associated relationship.

The polyimide-based film according to an embodiment of the present disclosure has a Kc value of 1.55 or less, wherein the Kc value is a curvature parameter measured in a wavelength range of 1.0 to 3.0 mm by phase stepped deflectometry (PSD). The Kc value represents a degree of waviness of the polyimide-based film according to an embodiment of the present disclosure.

The polyimide-based film according to an embodiment of the present disclosure may be prepared from monomer components including dianhydride and diamine.

In an embodiment of the present disclosure, "monomer components" may refer to all types of the monomers used in the production of a polyimide-based film. The monomer components may be present as a mixture, or each of the monomers included in the monomer components may be sequentially mixed.

According to an embodiment of the present disclosure, the dianhydride, for example, includes at least one selected from 2,2-bis(3,4-dicarboxyphenyl)hexafluoropropane dianhydride (6FDA), 3,3',4,4'-biphenyl tetracarboxylic dianhydride (BPDA), 4-(2,5-dioxotetrahydrofuran-3-yl)-1,2,3,4-tetrahydronaphthalene-1,2-dicarboxylic anhydride (IDA), pyromellitic dianhydride (PMDA), 3,3',4,4'-benzophenone tetracarboxylic dianhydride (BTDA), 4,4'-oxydiphthalic anhydride (ODPA), 4,4'-(3,4-bisdicarboxyphenoxy-diphenyl sulfide dianhydride (BDSDA), 3,3',4,4'-diphenylsulfonetetracarboxylic dianhydride ($SO_2$DPA), 4,4'-(4,4'-Isopropylidenediphenoxy)bis(phthalic anhydride) (6HBDA), cyclobutane-1,2,3,4-tetracarboxylic dianhydride (CBDA), 1,2,3,4-cyclopentane-tetracarboxylic dianhydride (CPDA), 1,2,4,5-Cyclohexanetetracarboxylic Dianhydride (CHDA), and dicyclohexyl-3,4,3',4'-tetracarboxylic dianhydride (HBPDA). As the dianhydride, the above-described compound may be used alone or in a mixture of two or more compounds.

The diamine may, for example, include at least one selected from 3,4-oxydianiline (34ODA), 4,4'-oxydianiline (4ODA), p-phenylenediamine (pPDA), m-phenylenediamine (mPDA), 4,4-methylenedianiline (pMDA), 3,3-methylenedianiline (mMDA), 1,3-Bis(3-aminophenoxy)benzene (133APB), 1,3-Bis(4-aminophenoxy)benzene (134APB), 2,2'-bis[4-(4-aminophenoxy)phenyl] hexafluoropropane (4BDAF), 2,2'-bis(3-aminophenyl)hexafluoropropane (33-6F), 2,2'-bis(4-aminophenyl)hexafluoropropane (44-6F), bis(4-aminophenyl)sulfone (4DDS), bis(3-aminophenyl) sulfone (3DDS), 2,2'-bis(trifluoromethyl)benzidine (TFDB), 1,3-cyclohexanediamine (13CHD), 1,4-cyclohexanediamine (14CHD), 2,2-bis[4-(4-aminophenoxy)phenyl]propane (6HMDA), 2,2-bis(3-amino-4-hydroxyphenyl) hexafluoropropane (DBOH), bis[4-(4-aminophenoxy)phenyl] sulfone, bis[4-(3-aminophenoxy)phenyl] sulfone, 9,9-bis(4-aminophenyl)fluorene (FDA) and 9,9-bis(4-amino-3-fluorophenyl)fluorene (F-FDA). As the diamine, the above-described compound may be used alone or in a mixture of two or more compounds.

The polyimide film prepared by monomer s including dianhydride and diamine may be a polyimide-based film having an imide repeating unit. However, the polyimide-based film according to the present disclosure is not limited thereto.

According to an embodiment of the present disclosure, the monomer components may further include a dicarbonyl compound. When the monomer components further include a dicarbonyl compound, in addition to dianhydride and diamine, the polyimide-based film may have a polyamide-imide copolymer structure having an imide repeating unit and an amide repeating unit.

Since the film having a polyamide-imide copolymer structure has the imide repeating unit, in one embodiment of the present disclosure, a film having a polyamide-imide copolymer structure is also referred to as a "polyimide-based film". Therefore, the polyimide-based film according to an embodiment of the present disclosure may include a polyimide film and a polyamide-imide film.

According to an embodiment of the present disclosure, the dicarbonyl compound may include at least one of an aromatic dicarbonyl compound and an aliphatic dicarbonyl compound.

The aromatic dicarbonyl compound according to an embodiment of the present disclosure may be represented by Formula 1 below.

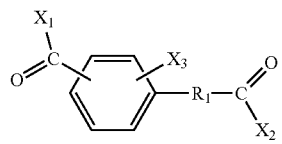

[Formula 1]

In Formula 1, $R_1$ represents a single bond, *—Ar—*, *—O—Ar—*, *-CAL-*, or *—O-CAL-*, $X_1$ and $X_2$ represent each independently hydrogen, a hydroxy group (OH) or a halogen element, and $X_3$ represents hydrogen or a halogen element, wherein "Ar" represents a substituted or unsubstituted arylene group, and "CAL" represents a cycloaliphatic group.

The arylene group is, for example, a phenylene group represented by the following Formula 2.

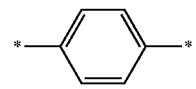

[Formula 2]

According to an embodiment of the present disclosure, as an example of the unsubstituted allylene group, there is a phenylene group represented by Formula 2.

Further, as an example of the substituted arylene group, there is a phenylene group in which hydrogen (H) of a benzene ring is substituted with a halogen element. More specifically, the substituted arylene group is, for example, a chlorophenylene group in which hydrogen (H) of a benzene ring is substituted with chlorine (Cl).

In Formula 1, at least one of $X_1$ and $X_2$ may be a halogen element, and the halogen element may be a chlorine (Cl) atom. In addition, $X_3$ may be hydrogen (H) or chlorine (Cl).

The aromatic dicarbonyl compound may include at least one of a compound represented by the following Formula 3, a compound represented by the following Formula 4, a compound represented by the following Formula 5, a compound represented by the following Formula 6, a compound represented by the following Formula 7, a compound represented by the following Formula 8 and a compound represented by the following Formula 9.

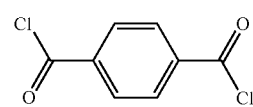

[Formula 3]

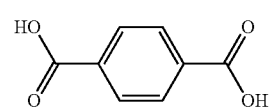

[Formula 4]

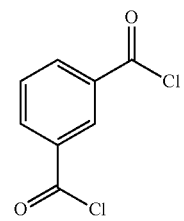

[Formula 5]

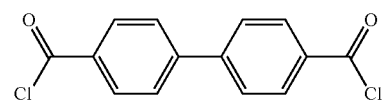

[Formula 6]

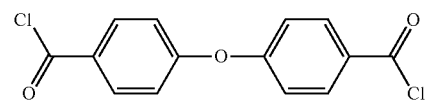

[Formula 7]

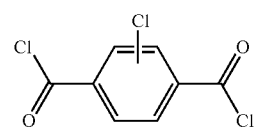

[Formula 8]

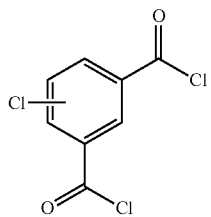

[Formula 9]

According to an embodiment of the present disclosure, the aromatic dicarbonyl compound may, for example, include at least one of terephthaloyl chloride (TPC) (Formula 3), terephthalic acid (TPA) (Formula 4), isophthaloyl dichloride (IPC) (Formula 5), 1,1'-biphenyl-4,4'-dicarbonyl dichloride (BPDC) (Formula 6), 4,4'-oxybisbenzoyl chloride (ODBC) (Formula 7) and 2-chloroterephthaloyl dichloride.

In addition, the aliphatic dicarbonyl compound according to an embodiment of the present disclosure may be an alicyclic dicarbonyl compound. The aliphatic dicarbonyl compound may include at least one of a compound represented by the following Formula 10, a compound represented by the following Formula 11, a compound represented by the following Formula 12, and a compound represented by the following Formula 13, and the compounds represented by the following formulas 10 to 13 may also be referred to as alicyclic compounds.

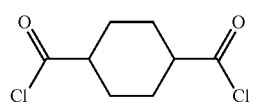

[Formula 10]

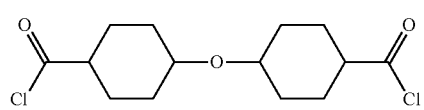

[Formula 11]

[Formula 12]

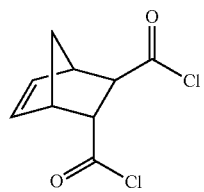

[Formula 13]

According to an embodiment of the present disclosure, as the dicarbonyl compound, the above-described compound may be used alone or as a mixture of two or more thereof.

According to an embodiment of the present disclosure, the polyimide-based film has a Kc value of 1.55 or less. The Kc value is a curvature parameter measured for waviness having a wavelength range of 1.0 to 3.0 mm formed on a polyimide-based film by phase stepped deflectometry (PSD).

According to an embodiment of the present disclosure, the Kc value means the degree of waviness having a wavelength of 1.0 to 3.0 mm formed on the polyimide-based film.

The waviness is also called "wave shape" or "wave pattern curve".

Hereinafter, waviness will be described with reference to FIG. 5.

Figure 5:
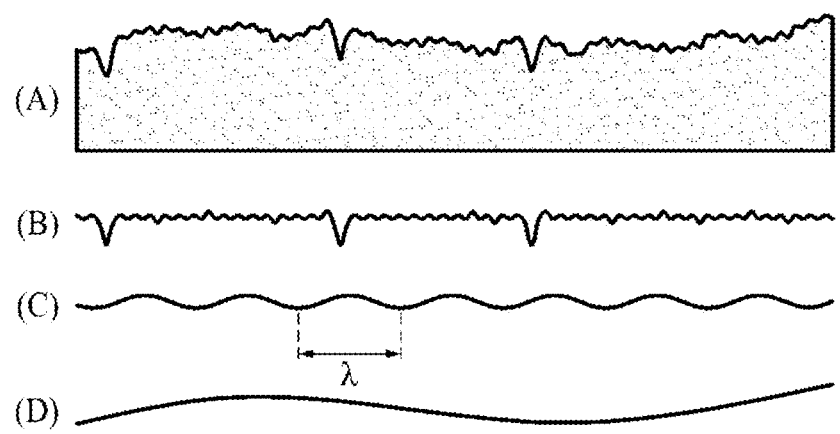
FIG. 5 is a cross-sectional view illustrating surface roughness, waviness and form.

FIG. 5 is a cross-sectional view illustrating surface roughness, waviness and form.

Assuming that there is an object having a cross-sectional profile as shown in (A) of FIG. 5, the surface roughness is represented by (B) and is determined by a fine curve that appears at the smallest interval on the surface of (A) of FIG. 5, the waviness is represented by (C) and is a curve of the surface appearing at an interval greater than the interval of surface roughness (B), and the form is represented by (D) and appears at an interval larger than the interval of waviness (C) which is the external appearance of an object.

Specifically, the surface roughness represented by (B) of FIG. 5 is fine curves drawn around an imaginary centerline extending in a straight line when a virtual center line is set along a fine curve in a cross section represented by (A) of FIG. 5 and the virtual center line extends in a straight line. In the surface roughness represented by (B) of FIG. 5, the interval between fine curves may be about several μm to tens of μm.

The waviness represented by (C) of FIG. 5 is the curve of a surface that appears at an interval greater than the interval of the surface roughness (B), expressed around an imaginary straight line. In the waviness represented by (C) of FIG. 5, the interval between the curves may be about several hundreds of micrometers (μm) to several centimeters (cm).

According to an embodiment of the present disclosure, the interval between the curves is referred to as "wavelength (λ)". The waviness shown in (C) of FIG. 5 may have a wavelength A of about several hundreds of micrometers (μm) to several centimeters (cm).

According to an embodiment of the present disclosure, the Kc value is a curve parameter measured for a waviness having a wavelength of 1.0 to 3.0 mm. The Kc value according to an embodiment of the present disclosure is used to evaluate the degree of waviness in the range of a wavelength (λ) of 1.0 to 3.0 mm formed on the polyimide-based film.

In general, the optimal viewing distance of a human is about 30 to about 40 cm, and the human eye has high resolution for a curve having an interval of 1 to 3 mm at a viewing distance of about 30 to about 40 cm. Accordingly, when waviness having a wavelength (λ) of 1.0 to 3.0 mm, that is, a curve having an interval of 1 to 3 mm, is formed on the surface of a display device, such waviness is very easily perceived by the human eye. In addition, this waviness causes distortion of the screen.

According to an embodiment of the present disclosure, by adjusting the Kc value of the polyimide-based film to 1.55 or less, it is possible to minimize the curve visually recognized by the human eye. In addition, by adjusting the Kc value of the polyimide-based film to 1.55 or less, when the polyimide-based film according to an embodiment of the present disclosure is used as a cover window of a display device, curve visually recognized by the user's eyes can be minimized and screen distortion can be minimized.

According to an embodiment of the present disclosure, the Kc value is measured using an Optimap™ PSD (Rhopoint Instruments, UK).

According to an embodiment of the present disclosure, the Optimap™ PSD of Rhopoint Instruments (UK) is used to measure the Kc value, and the Kc value is digitized by the program of Optimap™ PSD. According to an embodiment of the present disclosure, a curvature (K) and a profile of a surface to be measured are measured by phase stepped deflectometry (PSD), and in this case, a periodic sine-wave pattern is used.

It may be interpreted that a low Kc value of the polyimide-based film means a small change in curvature at each point on the surface of the polyimide-based film. The small change in curvature can be interpreted as a small number of periodically changing patterns such as wave patterns. Therefore, the polyimide-based film is considered more flat when the Kc value is small than when the Kc value is large.

According to an embodiment of the present disclosure, the polyimide-based film has a Kc value of 1.55 or less. When the polyimide-based film has a Kc value of 1.55 or less, surface curvature such as waviness is small and excellent evenness is realized. When such a polyimide-based film is used as a cover window of a display device, screen distortion does not occur. When a polyimide-based film having a Kc value of 1.55 or less is used as a cover window of a display device, wave patterns on the display screen may be not visible to users having ordinary vision.

As the Kc value of the polyimide-based film decreases, the evenness of the polyimide-based film may be improved. For example, according to another embodiment of the present disclosure, the polyimide-based film may have a Kc value of 1.45 or less. When the Kc value of the polyimide-based film is 1.45 or less, almost no waviness perceptible to the human eye is generated on the polyimide-based film.

Meanwhile, the drying conditions become more harsh than necessary in order to produce a polyimide-based film having a Kc value of 1.10 or less, and the productivity of products may be deteriorated.

Therefore, according to an embodiment of the present disclosure, the Kc value of the polyimide-based film may be adjusted within the range of 1.10 to 1.55. More specifically, according to an embodiment of the present disclosure, the polyimide-based film may have a Kc value of 1.10 to 1.45.

According to an embodiment of the disclosure, the Kc value can be measured by the following method:

<Measurement Method of Kc Value>

Measuring device: Optimap™ (PSD) from Rhopoint
Optical Mode: Extra dull
Display Mode: Curvature Mode (X+Y Scan)
Curvature mode K: 1.0 to 3.0 mm wavelength range
Measurement method: a sheet of black matte paper is placed on a surface plate in a dark room, the sample to be measured is placed thereon, the Kc value is measured 10 times, and the average value is used as the Kc value of the sample.
Film sample: A film having a thickness of 10 μm or more, more specifically, 50 μm or more, and a thickness deviation within ±2% is used. Out of the thickness deviation, the Kc value may be distorted due to the thickness deviation. In an embodiment of the present disclosure, a polyimide-based film sample having a width of 15 cm×a length of 15 cm×thickness of 80 μm is used for Kc measurement (thickness deviation±2%).
Other: when measuring with a microscope, foreign matter with 50 μm or more of particle diameter is present in 0.005 ea/cm$^2$ or less.

According to an embodiment of the present disclosure, the polyimide-based film may have various thicknesses. The polyimide-based film may have a thickness of, for example, 10 to 250 μm, and more specifically, may have a thickness of 10 to 100 μm.

In addition, the polyimide-based film of the present disclosure has excellent optical properties. For example, the polyimide-based film according to an embodiment of the present disclosure has a haze of 2.0% or less, based on a film thickness of 80 μm, an optical transmittance of 87% or more at a wavelength of 380 to 780 nm, and a yellow index of 5.0 or less. More specifically, according to an embodiment of the present disclosure, the polyimide-based film may have a haze of 0.2 to 0.3% based on a thickness of 80 μm.

As described above, the polyimide-based film according to an embodiment of the present disclosure has a Kc value of 1.55 or less, and thus has excellent surface characteristics as well as excellent optical characteristics. Accordingly, the polyimide-based film according to the present disclosure may be used as a cover window, a transparent protective film, a light diffusion plate or a liquid crystal alignment layer of a display device, a base film of a hard coating film, or a substrate of a flexible display.

In addition, the polyimide-based film according to an embodiment of the present disclosure may be used, for example, as a substitute for glass.

In order for the polyimide-based film to replace glass, the polyimide-based film requires excellent optical properties as well as excellent surface properties. Conditions for excellent surface properties include, for example, uniform thickness, surface evenness and low surface roughness. Here, the surface evenness includes the case where there are no or very few wrinkles or curves on the surface.

When the surface properties of the polyimide-based film, particularly the uniformity of the surface, are not excellent, light passing through the polyimide-based film may be distorted. As a result, distortion may occur on the screen viewed through the polyimide-based film.

Distortion on the screen viewed through the polyimide-based film can be confirmed through an image projected on a flat surface when light is transmitted through the polyimide-based film in a dark environment, as shown in FIG. 1.

Figure 2:
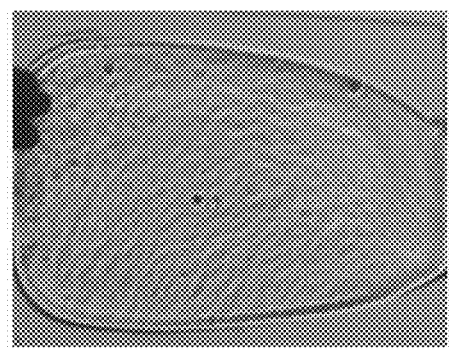
FIG. 2 is an example of a projection image obtained by a method of projecting an image.

Specifically, FIG. 1 is a schematic diagram illustrating a method of projecting an image of a film, and FIG. 2 is an example showing a projected image 50 obtained by an image projection method.

Referring to FIG. 1, light 20 emitted from a light source 10 passes through a projection target film 30 and is incident onto a flat surface 40 to form a projection image 50.

The case where the projected image 50 projected on the flat surface 50 is clean and there is no difference in shade in the image means that the projection target film 30 is flat and there is no waviness or the like. Meanwhile, as shown in FIG. 2, the case where a difference in shade occurs in the projected image means that the projection target film 30 is not flat and image distortion occurs.

When the polyimide-based film has a large waviness, image distortion may occur on the screen displayed through the polyimide-based film.

Such waviness may occur when a polyimide-based film is produced by casting.

When a liquid resin composition formed by a polyimide-based resin is cast on a flat substrate and is then dried to produce a polyimide-based film, the evenness of the polyimide-based film decreases in the process of drying for solvent volatilization, resulting in waviness. For example, in the process of drying the polyimide-based film using hot air, waviness may occur in the polyimide-based film depending on the intensity of the hot air and the application time of the hot air, thus causing deterioration in the evenness of the polyimide-based film.

When the wind speed of the hot air applied to the gel-type polyimide-based film formed by casting to dry the gel-type polyimide-based film is strong, marks may be formed on the gel-type polyimide-based film by the hot air. In addition, when the temperature of the hot air is excessively high, nonuniform portions may be formed on the surface due to rapid volatilization of the solvent.

According to an embodiment of the present disclosure, the polyimide-based film having a Kc value of 1.55 or less can be produced by optimizing the drying conditions of the polyimide-based film.

Hereinafter, a method of producing a polyimide-based film according to an embodiment of the present disclosure will be described in detail.

The method of producing a polyimide-based film according to an embodiment of the present disclosure includes preparing a liquid resin composition using monomer components including dianhydride and diamine, producing a gel-type film using the liquid resin composition, and first drying the gel-type film at 50 to 150° C. at a wind speed of 1.0 m/s or less for 2 to 20 minutes.

According to an embodiment of the present disclosure, first, a liquid resin composition is prepared using monomer components including dianhydride and diamine. The monomer components may further include a dicarbonyl compound.

The dianhydride, diamine and dicarbonyl compounds have already been described, and thus detailed explanations thereof are omitted to avoid redundancy.

A first solvent may be used for solution polymerization of the monomer components. Specifically, the monomer components may be reacted in the presence of the first solvent to prepare the first polymer solution. An organic solvent may be used as the first solvent for solution polymerization.

There is no particular limitation as to the type of the first solvent. The first solvent may, for example, include at least one selected from m-cresol, N-methyl-2-pyrrolidone (NMP), N-ethyl-2-pyrrolidone (NEP), dimethylformamide (DMF), diethylformamide (DEF), dimethylacetamide (DMAc), diethyl acetamide (DEAc), acetone, ethyl acetate, propylene glycol monomethyl ether (PGME) and propylene glycol monomethyl ether acetate (PGMEA). In addition, a low-boiling-point solvent such as tetrahydrofuran (THF) or chloroform, or a weakly absorptive solvent such as γ-butyrolactone may be used as the first solvent. The first solvent may be used alone or in a combination of two or more depending on the purpose.

There is no particular limitation as to the content of the first solvent. The first solvent may have a content of 50 to 95% by weight based on the total weight of the first polymer solution. More specifically, the first solvent may have a content of 70 to 90% by weight based on the total weight of the first polymer solution.

When the monomer components do not include the dicarbonyl compound, the molar amount of dianhydride and the molar amount of diamine may be adjusted to be equal to each other.

When the monomer components include the dicarbonyl compound, the molar amount of the mixture of dianhydride and the dicarbonyl compound may be adjusted to be equal to the molar amount of diamine.

There is no particular limitation as to the method applied to the preparation of the liquid resin composition using monomer components. Here, the liquid resin composition can be referred to as a liquid polyimide-based resin composition.

According to an embodiment of the present disclosure, the preparing the liquid resin composition includes reacting monomer components in the presence of the first solvent to prepare the first polymer solution and adding a second solvent to the first polymer solution, followed by filtering and drying, to prepare a polymer solid, and dissolving the polymer solid in a third solvent.

However, embodiments of the present disclosure are not limited thereto, and a polyimide-based resin composition may also be prepared by preparing polyamic acid using monomer components including dianhydride and diamine and then performing thermal curing. In addition, a polyimide-based film may be formed in the form of a film immediately, without conducting filtration using the second solvent, after adding a chemical curing agent to the polyimide-based polymer solution including polyamic acid.

In order to prepare the liquid resin composition, first, monomer components are polymerized to prepare the first polymer solution. The first polymer solution may include a polyamic acid solution. At this time, there is no particular limitation as to the reaction conditions. The reaction temperature may be adjusted, for example, within the range of −10 to 80° C., and the reaction time may be adjusted to 2 to 48 hours. The preparation of the first polymer solution may be performed under an inert gas atmosphere such as argon or nitrogen.

Next, the first polymer solution may be imidized. At this time, the polyamic acid included in the first polymer solution may be imidized.

For the imidization, thermal imidization, chemical imidization, or a combination of thermal imidization and chemical imidization may be used.

According to an embodiment of the present disclosure, chemical imidization may be used. Chemical imidization is a method of applying a dehydrating agent such as acetic anhydride and an imidization catalyst such as isoquinoline, β-picoline, pyridine or tertiary amine to the first polymer solution.

The thermal imidization may be used in combination with the chemical imidization.

When the thermal imidization and chemical imidization are used in combination, the dehydrating agent and the imidization catalyst are added to the first polymer solution and then heated at 20 to 180° C. for 1 to 12 hours, so that the imidization may proceed.

Next, the second solvent is added to the first polymer solution, followed by filtering and drying to prepare the polymer solid.

According to an embodiment of the present disclosure, the second solvent is used to obtain the solid of the polyimide resin. Accordingly, a solvent that does not dissolve the polyamic acid contained in the first polymer solution may be used as the second solvent, and the polyimide polymer solid may be precipitated due to the difference in solubility.

A solvent having a lower polarity than the first solvent may be used as the second solvent. The second solvent may, for example, include at least one selected from water, alcohols, ethers and ketones.

There is no particular limitation as to the content of the second solvent. The second solvent may be used in an amount of 5 to 20 times the weight of the polyamic acid contained in the first polymer solution.

The conditions for drying after filtering the obtained polymer solid are determined in consideration of the boiling point of the second solvent and the first solvent remaining in the polymer solid. For example, the polymer solid may be dried at a temperature of 50 to 150° C. for 2 to 24 hours.

Next, the polymer solid is dissolved in the third solvent to prepare the liquid resin composition. The liquid resin composition can also be referred to as a polyimide-based resin composition.

According to an embodiment of the present disclosure, the third solvent may be the same as the first solvent. Thus, the third solvent may, for example, include at least one selected from m-cresol, N-methyl-2-pyrrolidone (NMP), N-ethyl-2-pyrrolidone (NEP), dimethylformamide (DMF), diethyl formamide (DEF), dimethylacetamide (DMAc), diethyl acetamide (DEAc), acetone, ethyl acetate, propylene glycol monomethyl ether (PGME) and propylene glycol monomethyl ether acetate (PGMEA).

The prepared liquid resin composition prepared as described above may have a viscosity of 100 to 300,000 cPs. When the viscosity of the liquid resin composition is less than 100 cPs, it may be difficult to form a film by casting the liquid resin composition, and it may be difficult to peel the film formed by casting the liquid resin composition from a casting substrate due to the low molecular weight. On the other hand, when the viscosity of the liquid resin composition exceeds 300,000 cPs, the pressure applied during the casting process increases due to the high viscosity, thus being disadvantageous in terms of processing.

More specifically, the liquid resin composition may have a viscosity of 1,000 to 250,000 cPs. When the liquid resin composition has a viscosity of 1,000 to 250,000 cPs, it is easy to form a film by casting the liquid resin composition, and it is also easy to dry the same. For example, when the viscosity of the liquid resin composition is 1,000 cPs or more, it is not difficult to form the film by casting the liquid resin composition, and it is possible to peel the film formed by casting from the casting substrate without difficulty. In addition, when the viscosity of the liquid resin composition is 250,000 cPs or less, the casting process may be performed without increasing the pressure for casting the liquid resin composition beyond what is necessary.

According to an embodiment of the present disclosure, the liquid resin composition may have a viscosity of 1000 to 30,000 cPs.

According to an embodiment of the present disclosure, the content of solid contained in the liquid resin composition may be adjusted within the range of 5 to 30% by weight based on the total weight of the liquid resin composition.

Next, the gel-like film is produced from the liquid resin composition. The film in a gel state can be referred to as an uncured polyimide-based film in a gel state.

A casting method may be applied to produce the gel-type film.

Specifically, according to an embodiment of the present disclosure, the preparation of the gel-like film includes casting the liquid resin composition on a support.

There is no particular limitation as to the casting method, and a casting method known in the art may be applied. The gel-like film is produced by casting.

A glass plate, an aluminum substrate, a circulating stainless belt, a stainless drum or a heat-resistant polymer film may be used as the support.

According to an embodiment of the present disclosure, the gel-type film is an uncured polyimide-based film, curing of which is not completed. In one embodiment of the present disclosure, even though the film is partially cured, when the curing is not completed, it is referred to as a gel-type film or an uncured polyimide-based film.

Next, the gel-type film is first dried at a wind speed of 1.0 m/s or less at 50 to 150° C. for 2 to 20 minutes.

More specifically, the gel-type film produced by casting may be first dried at a temperature of 70 to 150° C. and a wind speed of 1.0 m/s or less for 2 to 20 minutes.

When the first drying period exceeds 20 minutes, the process efficiency may be deteriorated, and when hot air is applied for a long period of time, waviness may be formed on the polyimide-based film.

In addition, when the first drying period is less than 2 minutes, the solvent contained in the gel-type film may not be completely dried and thus waviness may occur in the film.

According to an embodiment of the present disclosure, as the wind speed applied to the first drying increases, the drying period may decrease, and as the wind speed decreases, the drying period may increase. At this time, the wind speed is adjusted within a range such that the Kc value of the polyimide-based film does not exceed 1.55.

For example, in the first drying, the wind speed may be adjusted within the range of 0.2 m/s to 1.0 m/s.

Specifically, in the first drying, the drying coefficient conditions according to the following Equations 1 and 2 are satisfied when the drying temperature is A ° C., the wind speed is B m/s and the first drying period is T minutes:

$$0.5 \le [(A-40) \times B \times T]/100 \le 10 \qquad \text{[Equation 1]}$$

$$2 \le [(A-40) \times T]/100 \le 10 \qquad \text{[Equation 2]}$$

When the value of "[(A−40)×B×T]/100" in Equation 1 is less than 0.5 or when "[(A−40)×T]/100" in Equation 2 is less than 2, the first drying may not be complete. When drying is not complete in the first drying, most of the solvent will be removed in the subsequent second drying, etc. However, since the second drying is generally performed at a higher wind speed than that of the first drying, nonuniformity may occur in the polyimide-based film in the process of evaporating a large amount of solvent at a strong wind speed during second drying.

On the other hand, when the value of "[(A−40)×B×1]/100" in Equation 1 exceeds 10 or the value of "[(A−40)×T]/100" in Equation 2 exceeds 10, high-temperature hot air may be applied, or hot air with a high wind speed may be applied. When hot air at a high temperature is applied or hot air with a high wind speed is applied, unevenness such as waviness may occur in the polyimide-based film.

According to an embodiment of the present disclosure, drying is performed in order to remove the solvent contained in the gel-type film, and the Kc value of the polyimide-based film can be adjusted by optimizing the wind speed during drying.

In general, since a solvent having a high boiling point is used in the process of preparing a liquid resin composition, it can be inferred that a strong wind speed should be applied to the cast gel-like film in order to efficiently remove the solvent.

However, when, in the first drying, in which the solvent is not completely removed, a strong wind speed is applied to the gel-type film, a wave pattern or the like is formed on the gel-type film by the wind, and this wave pattern remains in the finished polyimide. As a result, the Kc value of the polyimide-based film may increase. In order to prevent such an increase in Kc, according to an embodiment of the present disclosure, the solvent is removed by applying wind to the gel-type film at a temperature, wind speed and time suitable for the drying coefficient conditions according to Equations 1 and 2.

In particular, when wind is applied to the gel-type film for a long period of time, a wave pattern or the like is formed on the surface of the polyimide-based film by the wind, thus making the polyimide-based film non-uniform and imparting a high Kc value to the polyimide-based film.

Accordingly, according to an embodiment of the present disclosure, the wind speed in the first drying is determined in consideration of the drying period of time and temperature. The wind speed is measured as follows.

<Method of Measuring Wind Speed>

Measurement Equipment: TSI 5725 Anemometer

Measurement method: An anemometer is mounted at a height of about 1 cm above the support, and the wind speed is measured while the direction of the measurement entrance of the anemometer is parallel to the surface of the support. When the wind speed exceeds 1.0 m/s in the first drying, waviness may occur in the polyimide-based film and the waviness may increase. Therefore, according to an embodiment of the present disclosure, the wind speed in the first drying may be maintained at 1.0 m/s or less, and the wind speed may be 0.8 m/s or less, or 0.5 m/s or less, depending on the temperature of the wind.

However, when the wind speed is less than 0.2 m/s, the wind speed may be affected by a change in pressure or convection of the surrounding air. For this reason, it is difficult to maintain the wind speed of 0.2 m/s or less and it is not easy to control the wind speed. As a result, there may be limitations in obtaining products with uniform quality. Accordingly, according to an embodiment of the present disclosure, the wind speed may be adjusted to 0.2 m/s or more in the first drying.

In addition, the temperature in the first drying may be maintained at 50 to 150° C., or, if necessary, in the range of 70 to 150° C.

In general, the drying efficiency increases as the temperature increases. On the other hand, when the temperature during first drying increases such that the drying temperature approaches the boiling point of the solvent, bubbles may be formed on the surface of the polyimide-based film, and bending may occur due to sudden volatilization of the solvent, so the surface uniformity of the polyimide-based film is deteriorated.

Therefore, the first drying is performed at a temperature of 50° C. or higher in order to ensure drying efficiency, and is performed at a temperature of 150° C. or lower in order to prevent sudden volatilization of the solvent. In order to improve drying efficiency, the first drying may be performed in a temperature range of 70 to 150° C.

According to an embodiment of the present disclosure, after the first drying, the proportion of residual solvent content of the uncured polyimide-based film (gel-type film) may be adjusted to 50% by weight or less. More specifically, the proportion of the residual solvent content of the uncured polyimide-based film after the first drying may be adjusted to 40% by weight or less.

According to an embodiment of the present disclosure, after the first drying, the gel-type film may be second dried at a wind speed of 1.0 to 5.0 m/s at 70 to 140° C. When the wind speed of the second drying is less than 1.0 m/s or the temperature thereof is less than 70° C., the speed of the second drying may be excessively decreased. When the speed of second drying is excessively decreased, the efficiency of the process may decrease, and the physical properties of the polyimide-based film may change due to the increase in the drying time.

Since the gel-like film is dried and hardened to some extent by the first drying, there is little possibility that the surface properties of the gel-type film are changed by the wind applied in the second drying. However, when the wind speed of the second drying exceeds 5.0 m/s or the temperature thereof exceeds 140° C., wrinkles or bending may occur in the polyimide-based film due to the high-temperature strong wind. When wrinkles or bending occur in the polyimide-based film, the waviness of the polyimide-based film increases and the curvature parameter Kc may exceed 1.55. Meanwhile, the wind speed in the second drying may be adjusted in the range of, for example, 1.5 to 5.0 m/s, and more specifically, the wind speed in the second drying may be adjusted in the range of 1.6 to 3.0 m/s. Further, in the second drying, the temperature may be adjusted in the range of 100 to 140° C.

According to an embodiment of the present disclosure, after the second drying, the gel-type film may be subjected to first heat treatment.

In the first heat treatment, a known thermal curing process may be applied. For example, the gel-type film may be heat-treated at a temperature of 100 to 500° C. for 1 minute to 1 hour. Through such heat treatment, the gel-type film is heat-cured to complete the polyimide-based film. The first heat treatment is also referred to as heat curing.

The first heat treatment may be performed on the support or a separate heat-treatment support. For example, after second drying, the gel-type film may be separated from the support, may be fixed to a support for the first heat treatment and then may be subjected to the first heat treatment. A pin-type frame or a clip-type frame may be used to support the gel-type film.

According to an embodiment of the present disclosure, the content of the volatile component remaining in the polyimide-based film after the first heat treatment may be adjusted within a range of 5% by weight or less.

According to an embodiment of the present disclosure, the second heat treatment may be performed while a predetermined tension is applied to the first heat-treated polyimide-based film. Residual stress inside the polyimide-based film may be removed by the second heat treatment.

When the second heat treatment is performed, the coefficient of thermal expansion of the polyimide-based film may be reduced. For example, the second heat treatment results in residual stress, which causes shrinkage of the polyimide-based film, thus reducing thermal expansion and reducing the hysteresis of the thermal expansion coefficient in the polyimide-based film.

The tension and temperature applied to the second heat treatment are interrelated. Therefore, the tension may vary depending on the temperature applied to the second heat treatment.

The second heat treatment may be performed at a temperature of 100 to 500° C. for 1 minute to 1 hour, and may be performed at a temperature of 250 to 350° C. for 2 to 15 minutes.

Another embodiment of the present disclosure provides a polyimide-based film produced according to the above-described producing method.

Hereinafter, the present disclosure will be described in more detail with reference to specific Preparation Examples and Examples. These examples should not be construed as limiting the scope of the present disclosure.

Preparation Example 1

419.1 g of N,N-dimethylacetamide (DMAc) as a first solvent was charged in a 1 L reactor equipped with a stirrer, a nitrogen injector, a dropping funnel, a temperature controller and a cooler, while nitrogen was passed through the reactor, the temperature of the reactor was adjusted to 25° C., 32.023 g (0.10 mol) of TFDB as a diamine was dissolved therein, and the solution was maintained at 25° C. 8.885 g (0.02 mol) of 6FDA as a dianhydride was added to the solution and dissolved and allowed to react while stirring. At this time, the temperature of the reactor was lowered to 10° C., the temperature of the solution was maintained at 8° C., 16.24 g (0.08 mol) of TPC as a dicarbonyl compound was added to the solution, and the reaction was allowed to proceed at 25° C. for 12 hours to obtain a first polymer solution having a solid content of 12% by weight. The first polymer solution may include polyamic acid. Therefore, the first polymer solution is also referred to as a polyamic acid solution.

1.58 g of pyridine and 2.02 g of acetic anhydride were added to the obtained first polymer solution, and the resulting solution was stirred for 30 minutes and then stirred at 80° C. for 0.5 hours and cooled to room temperature, and 10 L of methanol as a second solvent was added to precipitate a solid. The precipitated solid was filtered, pulverized, washed again with 2 L of methanol, and dried in a vacuum at 100° C. for 6 hours to obtain a powdery polyimide-based polymer solid. The obtained polyimide-based polymer solid was dissolved again in DMAc as a third solvent to prepare a liquid resin composition having a solid content of 12% by weight. The liquid resin composition is also referred to as a polyimide-based resin composition. Here, the polyimide-based resin composition is a polyamide-imide resin composition.

Preparation Example 2

432.4 g of N,N-dimethylacetamide (DMAc) as a first solvent was charged in a 1 L reactor equipped with a stirrer, a nitrogen injector, a dropping funnel, a temperature controller and a cooler, while nitrogen was passed through the reactor, the temperature of the reactor was adjusted to 25° C., 32.023 g (0.10 mol) of TFDB as a diamine was dissolved therein, and the solution was maintained at 25° C. 5.884 g (0.02 mol) of BPDA as a dianhydride was added to the solution, followed by stirring for 2 hours. Then, 8.885 g (0.02 mol) of 6FDA as a dianhydride was added thereto and dissolved and allowed to react while stirring for a predetermined period of time. At this time, the temperature of the reactor was lowered to 10° C., the temperature of the solution was maintained at 8° C., 12.18 g (0.06 mol) of TPC as a dicarbonyl compound was added to the solution, and the reaction was allowed to proceed at 25° C. for 12 hours to obtain a first polymer solution having a solid content of 12% by weight.

3.16 g of pyridine and 4.04 g of acetic anhydride were added to the obtained first polymer solution, and the resulting solution was stirred for 30 minutes and then stirred at 80° C. for 0.5 hours and cooled to room temperature, and 10 L of methanol as a second solvent was added to precipitate a solid. The precipitated solid was filtered, pulverized, washed again with 2 L of methanol, and dried in a vacuum at 100° C. for 6 hours to obtain a powdery polyimide-based polymer solid. The obtained polyimide-based polymer solid was dissolved again in DMAc as a third solvent to prepare a liquid resin composition having a solid content of 12% by weight. The liquid resin composition is also referred to as a polyimide-based resin composition. Here, the polyimide-based resin composition is a polyamide-imide resin composition.

Preparation Example 3

400.9 g of N,N-dimethylacetamide (DMAc) as a first solvent was charged in a 1 L reactor equipped with a stirrer, a nitrogen injector, a dropping funnel, a temperature controller and a cooler, while nitrogen was passed through the reactor, the temperature of the reactor was adjusted to 25° C., 32.023 g (0.10 mol) of TFDB as a diamine was dissolved therein, and the solution was maintained at 25° C. 1.961 g (0.01 mol) of CBDA as a dianhydride was added to the solution, followed by stirring for 2 hours. Then, 4.443 g (0.01 mol) of 6FDA as a dianhydride was added and dissolved and allowed to react while stirring for a predetermined period of time. At this time, the temperature of the reactor was lowered to 10° C., the temperature of the solution was maintained at 8° C., 16.24 g (0.08 mol) of TPC as a dicarbonyl compound was added to the solution, and the reaction was allowed to proceed at 25° C. for 12 hours to obtain a first polymer solution having a solid content of 12% by weight.

1.58 g of pyridine and 2.02 g of acetic anhydride were added to the obtained first polymer solution, and the resulting solution was stirred for 30 minutes and then stirred at 80° C. for 0.5 hours and cooled to room temperature, and 10 L of methanol as a second solvent was added to precipitate a solid. The precipitated solid was filtered, pulverized, washed again with 2 L of methanol and dried in a vacuum at 100° C. for 6 hours to obtain a powdery polyimide-based polymer solid. The obtained polyimide-based polymer solid was dissolved again in DMAc as a third solvent to prepare a liquid resin composition having a solid content of 12% by weight. The liquid resin composition is also referred to as a polyimide-based resin composition. Here, the polyimide-based resin composition is a polyamide-imide resin composition.

Preparation Example 4

587.5 g of N,N-dimethylacetamide (DMAc) as a first solvent was charged in a 1 L reactor equipped with a stirrer, a nitrogen injector, a dropping funnel, a temperature controller and a cooler, while nitrogen was passed through the reactor, the temperature of the reactor was adjusted to 25° C., 640.046 g (0.20 mol) of TFDB as a diamine was dissolved therein, and the solution was maintained at 25° C. 11.77 g (0.04 mol) of BPDA as a dianhydride was added to the solution, followed by stirring for 2 hours. Then, 71.8 g (0.16 mol) of 6FDA as a dianhydride was added and dissolved and allowed to react while stirring for a predetermined period of time. The reaction was allowed to proceed at 25° C. for 12 hours to obtain a first polymer solution having a solid content of 20% by weight.

6.328 g of pyridine and 8.08 g of acetic anhydride were added to the obtained first polymer solution and the resulting solution was stirred for 30 minutes and then stirred at 80° C. for 1 hour and cooled to room temperature, and 10 L of methanol as a second solvent was added to precipitate a solid. The precipitated solid was filtered, pulverized, washed again with 2 L of methanol and dried in a vacuum at 100° C. for 6 hours to obtain a powdery polyimide-based polymer solid. The obtained polyimide-based polymer solid was dissolved again in DMAc as a third solvent to prepare a liquid resin composition having a solid content of 20% by weight. The liquid resin composition is also referred to as a polyimide-based resin composition. Here, the polyimide-based resin composition is a polyimide resin composition.

Example 1

A polyimide-based resin composition, which is the liquid resin composition prepared in Preparation Example 1, was cast on a substrate to produce a gel-type film (uncured polyimide-based film in a gel state), and the gel-type film was first dried at 80° C. at a wind speed of 0.2 m/s for 20 minutes and second dried at an elevated wind speed of 1.6 m/s at 140° C. for 10 minutes.

The gel-type film was mounted on a pin-type tenter and first heat-treated for 1 hour while the temperature was raised from 120° C. to 280° C. The gel-like film was cured by the first heat treatment to produce a polyimide-based film. The produced polyimide-based film is a polyamide-imide film.

The polyimide-based film produced by the first heat treatment was removed from the tenter frame and then subjected to second heat treatment at 280° C. for 5 minutes to remove residual stress in the film.

Examples 2 to 8

Polyimide-based films were produced in the same manner as in Example 1, except that the first drying conditions were as shown in Table 1 below, and these polyimide-based films were referred to as Examples 2 to 8.

Example 9

A polyimide-based resin composition, which is the liquid resin composition prepared in Preparation Example 2, was cast on a substrate to produce a gel-type film, and the gel-type film was first dried at 80° C. at a wind speed of 0.2 m/s for 20 minutes and second dried at an elevated wind speed of 1.6 m/s at 140° C. for 10 minutes.

The gel-type film was mounted on a pin-type tenter and first heat-treated for 1 hour while the temperature was raised from 120° C. to 280° C. The gel-like film was cured by the first heat treatment to produce a polyimide-based film. The produced polyimide-based film is a polyamide-imide film.

The heat-treated film was removed from the tenter frame and then further subjected to heat treatment at 280° C. for 5 minutes to remove residual stress in the film.

The polyimide-based film produced by the first heat treatment was removed from the tenter frame and then subjected to second heat treatment at 280° C. for 5 minutes to remove residual stress in the film.

Examples 10 to 16

Polyimide-based films were produced in the same manner as in Example 9, except that the first drying conditions were as shown in Table 1 below, and these polyimide-based films were referred to as Examples 10 to 16.

Example 17

A polyimide-based resin composition, which is the liquid resin composition prepared in Preparation Example 3, was cast on a substrate to prepare a gel-type film (uncured polyimide-based film in a gel state), and the gel-type film was first dried at 80° C. at a wind speed of 0.2 m/s for 20 minutes and second dried at an elevated wind speed of 1.6 m/s at 140° C. for 10 minutes.

The gel-type film was mounted on a pin-type tenter and first heat-treated for 1 hour while the temperature was raised from 120° C. to 250° C. The gel-like film was cured by the first heat treatment to produce a polyimide-based film. The produced polyimide-based film is a polyamide-imide film.

The heat-treated film was removed from the tenter frame and then subjected to second heat treatment at 250° C. for 5 minutes to remove residual stress in the film.

Examples 18 to 24

Polyimide-based films were produced in the same manner as in Example 17, except that the first drying conditions were as shown in Table 1 below, and these polyimide-based films were referred to as Examples 18 to 24.

Example 25

A polyimide-based resin composition, which is the liquid resin composition prepared in Preparation Example 4, was cast on a substrate to prepare a gel-type film (uncured polyimide-based film in a gel state), and the gel-type film was first dried at 80° C. at a wind speed of 0.2 m/s for 20 minutes and second dried at an elevated wind speed of 1.6 m/s at 140° C. for 10 minutes.

The gel-type film was mounted on a pin-type tenter and first heat-treated for 1 hour while the temperature was raised from 120° C. to 280° C. The gel-like film was cured by the first heat treatment to produce a polyimide-based film. The produced polyimide-based film is a polyamide-imide film.

The heat-treated film was removed from the tenter frame and then subjected to second heat treatment at 280° C. for 5 minutes to remove residual stress in the film.

Examples 26 to 32

Polyimide-based films were produced in the same manner as in Example 25, except that the first drying conditions were as shown in Table 1 below, and these polyimide-based films were referred to as Examples 26 to 32.

Comparative Examples 1 to 5

Polyimide-based films were produced in the same manner as in Example 1, except that the first drying conditions were as shown in Table 1 below, and these polyimide-based films were referred to as Comparative Examples 1 to 5.

Comparative Examples 6 to 10

Polyimide-based films were produced in the same manner as in Example 9, except that the first drying conditions were as shown in Table 1 below, and these polyimide-based films were referred to as Comparative Examples 6 to 10.

Comparative Examples 11 to 15

Polyimide-based films were produced in the same manner as in Example 17, except that the first drying conditions were as shown in Table 1 below, and these polyimide-based films were referred to as Comparative Examples 11 to 15.

Comparative Examples 16 to 20

Polyimide-based films were produced in the same manner as in Example 25, except that the first drying conditions were as shown in Table 1 below, and these polyimide-based films were referred to as Comparative Examples 16 to 20.

"[(A−40)×B×T]/100" in Equation 1 and "[(A−40)×T]/100" in Equation 2 were calculated based on the first drying conditions of Examples 1 to 32 and Comparative Examples 1 to 20, and are shown in Table 1.

TABLE 1

| | | First drying conditions | | | | |
|---|---|---|---|---|---|---|
| Item | Polyimide-based resin composition | Temperature (° C.) [A] | Wind speed (m/s) [B] | Time (min) [T] | (A-40) × B × T/100 | (A-40) × T/100 |
| Example 1 | Preparation Example 1 | 80 | 0.2 | 20 | 1.6 | 8 |
| Example 2 | Preparation Example 1 | 80 | 0.5 | 20 | 4 | 8 |
| Example 3 | Preparation Example 1 | 80 | 0.8 | 20 | 6.4 | 8 |
| Example 4 | Preparation Example 1 | 80 | 1 | 20 | 8 | 8 |
| Example 5 | Preparation Example 1 | 140 | 0.2 | 2.5 | 0.5 | 2.5 |
| Example 6 | Preparation Example 1 | 140 | 0.5 | 2.5 | 1.25 | 2.5 |
| Example 7 | Preparation Example 1 | 140 | 0.8 | 2.5 | 2 | 2.5 |
| Example 8 | Preparation Example 1 | 140 | 1 | 2.5 | 2.5 | 2.5 |
| Example 9 | Preparation Example 2 | 80 | 0.2 | 20 | 1.6 | 8 |
| Example 10 | Preparation Example 2 | 80 | 0.5 | 20 | 4 | 8 |
| Example 11 | Preparation Example 2 | 80 | 0.8 | 20 | 6.4 | 8 |
| Example 12 | Preparation Example 2 | 80 | 1 | 20 | 8 | 8 |
| Example 13 | Preparation Example 2 | 140 | 0.2 | 2.5 | 0.5 | 2.5 |
| Example 14 | Preparation Example 2 | 140 | 0.5 | 2.5 | 1.25 | 2.5 |
| Example 15 | Preparation Example 2 | 140 | 0.8 | 2.5 | 2 | 2.5 |
| Example 16 | Preparation Example 2 | 140 | 1 | 2.5 | 2.5 | 2.5 |
| Example 17 | Preparation Example 3 | 80 | 0.2 | 20 | 1.6 | 8 |
| Example 18 | Preparation Example 3 | 80 | 0.5 | 20 | 4 | 8 |
| Example 19 | Preparation Example 3 | 80 | 0.8 | 20 | 6.4 | 8 |
| Example 20 | Preparation Example 3 | 80 | 1 | 20 | 8 | 8 |
| Example 21 | Preparation Example 3 | 140 | 0.2 | 2.5 | 0.5 | 2.5 |
| Example 22 | Preparation Example 3 | 140 | 0.5 | 2.5 | 1.25 | 2.5 |
| Example 23 | Preparation Example 3 | 140 | 0.8 | 2.5 | 2 | 2.5 |
| Example 24 | Preparation Example 3 | 140 | 1 | 2.5 | 2.5 | 2.5 |
| Example 25 | Preparation Example 4 | 80 | 0.2 | 20 | 1.6 | 8 |
| Example 26 | Preparation Example 4 | 80 | 0.5 | 20 | 4 | 8 |
| Example 27 | Preparation Example 4 | 80 | 0.8 | 20 | 6.4 | 8 |
| Example 28 | Preparation Example 4 | 80 | 1 | 20 | 8 | 8 |
| Example 29 | Preparation Example 4 | 140 | 0.2 | 2.5 | 0.5 | 2.5 |
| Example 30 | Preparation Example 4 | 140 | 0.5 | 2.5 | 1.25 | 2.5 |
| Example 31 | Preparation Example 4 | 140 | 0.8 | 2.5 | 2 | 2.5 |
| Example 32 | Preparation Example 4 | 140 | 1 | 2.5 | 2.5 | 2.5 |
| Comparative Example 1 | Preparation Example 1 | 80 | 0.2 | 2.5 | 0.2 | 1 |

TABLE 1-continued

| | | First drying conditions | | | | |
|---|---|---|---|---|---|---|
| Item | Polyimide-based resin composition | Temperature (° C.) [A] | Wind speed (m/s) [B] | Time (min) [T] | (A-40) × B × T/100 | (A-40) × T/100 |
| Comparative Example 2 | Preparation Example 1 | 140 | 0.2 | 1.5 | 0.3 | 1.5 |
| Comparative Example 3 | Preparation Example 1 | 80 | 1 | 2.5 | 1 | 1 |
| Comparative Example 4 | Preparation Example 1 | 140 | 1 | 1.5 | 1.5 | 1.5 |
| Comparative Example 5 | Preparation Example 1 | 140 | 1.6 | 20 | 32 | 20 |
| Comparative Example 6 | Preparation Example 2 | 80 | 0.2 | 2.5 | 0.2 | 1 |
| Comparative Example 7 | Preparation Example 2 | 140 | 0.2 | 1.5 | 0.3 | 1.5 |
| Comparative Example 8 | Preparation Example 2 | 80 | 1 | 2.5 | 1 | 1 |
| Comparative Example 9 | Preparation Example 2 | 140 | 1 | 1.5 | 1.5 | 1.5 |
| Comparative Example 10 | Preparation Example 2 | 140 | 1.6 | 20 | 32 | 20 |
| Comparative Example 11 | Preparation Example 3 | 80 | 0.2 | 2.5 | 0.2 | 1 |
| Comparative Example 12 | Preparation Example 3 | 140 | 0.2 | 1.5 | 0.3 | 1.5 |
| Comparative Example 13 | Preparation Example 3 | 80 | 1 | 2.5 | 1 | 1 |
| Comparative Example 14 | Preparation Example 3 | 140 | 1 | 1.5 | 1.5 | 1.5 |
| Comparative Example 15 | Preparation Example 3 | 140 | 1.6 | 20 | 32 | 20 |
| Comparative Example 16 | Preparation Example 4 | 80 | 0.2 | 2.5 | 0.2 | 1 |
| Comparative Example 17 | Preparation Example 4 | 140 | 0.2 | 1.5 | 0.3 | 1.5 |
| Comparative Example 18 | Preparation Example 4 | 80 | 1 | 2.5 | 1 | 1 |
| Comparative Example 19 | Preparation Example 4 | 140 | 1 | 1.5 | 1.5 | 1.5 |
| Comparative Example 20 | Preparation Example 4 | 140 | 1.6 | 20 | 32 | 20 |

<Method of Measuring Physical Properties>

The physical properties of the polyimide-based films produced in Examples 1 to 32 and Comparative Examples 1 to 20 were measured by the following method and the results are shown in Table 2.

(1) Film Thickness Measurement

The thickness of the polyimide-based films produced in Examples and Comparative Examples was measured using an Anritsu Electronic Micrometer. The thickness deviation caused by the apparatus is ±0.5% or less.

(2) Optical Transmittance

The average optical transmittance of the polyimide-based films produced in Examples and Comparative Examples was measured in the wavelength range of 380 to 780 nm using a UV spectrometer (Cotica Minolta CM-3700d). The thickness of the polyimide-based films is shown in Table 1.

(3) Yellow Index (YI):

The yellow index of the polyimide-based films produced in Examples and Comparative Examples was measured using a UV spectrophotometer (CM-3700D, Konica Minolta Inc.) in accordance with ASTM E313.

(4) Haze

The haze of the polyimide-based films produced in Examples and Comparative Examples was measured using a haze Meter HM-150.

(5) Measurement of Kc Value

Measurement device: Optimap™ (PSD) of Rhopoint
Optical Mode: Extra dull
Display Mode: Curvature Mode (X+Y Scan)
Curvature mode K: set wavelength range of 1.0 to 3.0 mm (Kc)
Measurement method: a sheet of black matte paper is placed on a surface plate in a dark room, the sample to be measured is placed thereon, the Kc value is measured 10 times, and the average value is used as the Kc value of the sample.
Film samples: polyimide-based films (Examples 1 to 32 and Comparative Examples 1 to 20) having a width of 15 cm×a length of 15 cm×thickness of 80 µm were used for Kc measurement (thickness deviation±2%).
Other: when measuring with a microscope, foreign matter with 50 µm or more of particle diameter is present in 0.005 ea/cm² or less.

TABLE 2

| | Thickness (µm) | Kc | Haze | Yellow index | Optical transmittance (%) |
|---|---|---|---|---|---|
| Example 1 | 80 ± 1.6 | 1.14 | 0.3 | 3.8 | 88.3 |
| Example 2 | 80 ± 1.6 | 1.324 | 0.3 | 3.7 | 88.4 |
| Example 3 | 80 ± 1.6 | 1.446 | 0.3 | 3.6 | 88.4 |

TABLE 2-continued

| | Thickness (μm) | Kc | Haze | Yellow index | Optical transmittance (%) |
|---|---|---|---|---|---|
| Example 4 | 80 ± 1.6 | 1.512 | 0.3 | 3.6 | 88.3 |
| Example 5 | 80 ± 1.6 | 1.153 | 0.3 | 3.7 | 88.4 |
| Example 6 | 80 ± 1.6 | 1.311 | 0.3 | 3.8 | 88.3 |
| Example 7 | 80 ± 1.6 | 1.449 | 0.3 | 3.6 | 88.5 |
| Example 8 | 80 ± 1.6 | 1.536 | 0.3 | 3.7 | 88.4 |
| Example 9 | 80 ± 1.6 | 1.149 | 0.3 | 4.2 | 88.1 |
| Example 10 | 80 ± 1.6 | 1.334 | 0.3 | 4.1 | 88.2 |
| Example 11 | 80 ± 1.6 | 1.473 | 0.3 | 4.2 | 88.1 |
| Example 12 | 80 ± 1.6 | 1.529 | 0.3 | 4.3 | 88 |
| Example 13 | 80 ± 1.6 | 1.172 | 0.3 | 4.2 | 88 |
| Example 14 | 80 ± 1.6 | 1.365 | 0.3 | 4.3 | 88.1 |
| Example 15 | 80 ± 1.6 | 1.411 | 0.3 | 4.2 | 88.1 |
| Example 16 | 80 ± 1.6 | 1.543 | 0.3 | 4.3 | 88 |
| Example 17 | 80 ± 1.6 | 1.213 | 0.3 | 4.8 | 87.7 |
| Example 18 | 80 ± 1.6 | 1.397 | 0.3 | 4.7 | 87.7 |
| Example 19 | 80 ± 1.6 | 1.476 | 0.3 | 4.7 | 87.8 |
| Example 20 | 80 ± 1.6 | 1.544 | 0.3 | 4.8 | 87.7 |
| Example 21 | 80 ± 1.6 | 1.194 | 0.3 | 4.7 | 87.8 |
| Example 22 | 80 ± 1.6 | 1.399 | 0.3 | 4.8 | 87.8 |
| Example 23 | 80 ± 1.6 | 1.487 | 0.3 | 4.8 | 87.8 |
| Example 24 | 80 ± 1.6 | 1.541 | 0.2 | 4.9 | 87.8 |
| Example 25 | 80 ± 1.6 | 1.121 | 0.2 | 1.8 | 90.2 |
| Example 26 | 80 ± 1.6 | 1.291 | 0.2 | 1.9 | 90.1 |
| Example 27 | 80 ± 1.6 | 1.334 | 0.2 | 1.7 | 90.2 |
| Example 28 | 80 ± 1.6 | 1.492 | 0.2 | 1.8 | 90.1 |
| Example 29 | 80 ± 1.6 | 1.117 | 0.2 | 1.7 | 90.2 |
| Example 30 | 80 ± 1.6 | 1.204 | 0.2 | 1.6 | 90.2 |
| Example 31 | 80 ± 1.6 | 1.401 | 0.2 | 1.7 | 90.1 |
| Example 32 | 80 ± 1.6 | 1.493 | 0.2 | 1.8 | 90 |
| Comparative Example 1 | 80 ± 1.6 | 1.593 | 0.3 | 3.7 | 88.4 |
| Comparative Example 2 | 80 ± 1.6 | 1.556 | 0.3 | 3.8 | 88.3 |
| Comparative Example 3 | 80 ± 1.6 | 1.623 | 0.3 | 3.7 | 88.3 |
| Comparative Example 4 | 80 ± 1.6 | 1.601 | 0.3 | 3.9 | 88.3 |
| Comparative Example 5 | 80 ± 1.6 | 1.723 | 0.3 | 3.9 | 88.3 |
| Comparative Example 6 | 80 ± 1.6 | 1.578 | 0.3 | 4.2 | 88.1 |
| Comparative Example 7 | 80 ± 1.6 | 1.596 | 0.3 | 4.3 | 88.1 |
| Comparative Example 8 | 80 ± 1.6 | 1.598 | 0.3 | 4.2 | 88.2 |
| Comparative Example 9 | 80 ± 1.6 | 1.593 | 0.3 | 4.3 | 88 |
| Comparative Example 10 | 80 ± 1.6 | 1.706 | 0.3 | 4.3 | 88 |
| Comparative Example 11 | 80 ± 1.6 | 1.586 | 0.3 | 4.8 | 87.7 |
| Comparative Example 12 | 80 ± 1.6 | 1.581 | 0.3 | 4.8 | 87.8 |
| Comparative Example 13 | 80 ± 1.6 | 1.6 | 0.3 | 4.7 | 87.7 |
| Comparative Example 14 | 80 ± 1.6 | 1.604 | 0.3 | 4.8 | 87.8 |
| Comparative Example 15 | 80 ± 1.6 | 1.736 | 0.3 | 4.9 | 87.7 |
| Comparative Example 16 | 80 ± 1.6 | 1.554 | 0.2 | 1.8 | 90.1 |
| Comparative Example 17 | 80 ± 1.6 | 1.555 | 0.2 | 1.9 | 90 |
| Comparative Example 18 | 80 ± 1.6 | 1.561 | 0.2 | 1.7 | 90.2 |
| Comparative Example 19 | 80 ± 1.6 | 1.554 | 0.2 | 1.9 | 90 |
| Comparative Example 20 | 80 ± 1.6 | 1.701 | 0.2 | 1.9 | 90 |

As can be seen from Table 2, the polyimide-based films according to Examples 1 to 32 according to the present disclosure have a Kc value of 1.55 or less. The Kc values of the polyimide-based films are affected by the temperature, wind speed and drying time in the first drying.

As can be seen from Tables 1 and 2, when the polyimide-based film is first dried at a relatively low temperature of 100° C. or less, the first drying should be performed for a relatively long period of time at various wind speeds within a range satisfying the drying coefficient conditions according to Equations 1 and 2 in order to obtain a low Kc value. In addition, when the polyimide-based film is first dried at a relatively high temperature exceeding 100° C., the first drying should be performed for a relatively short period of time at various wind speeds within a range that satisfies the drying coefficient conditions according to Equations 1 and 2, in order to obtain a low Kc value.

On the other hand, it can be seen that, when the polyimide-based film is first dried at a relatively low temperature of 100° C. or lower, in the case of drying for a short period, there may be problems in that the first drying is not sufficiently performed and a large amount of solvent volatilizes during the second drying. Accordingly, the Kc value of the polyimide-based film increases and the evenness decreases. In addition, it can be seen that, when the polyimide-based film is first dried at a relatively high temperature exceeding 100° C., in the case of drying for a long period, excessive solvent volatilization may occur and a wave pattern may be formed on the polyimide-based film by high-temperature hot air, so the Kc value increases and the evenness decreases.

Figure 3:
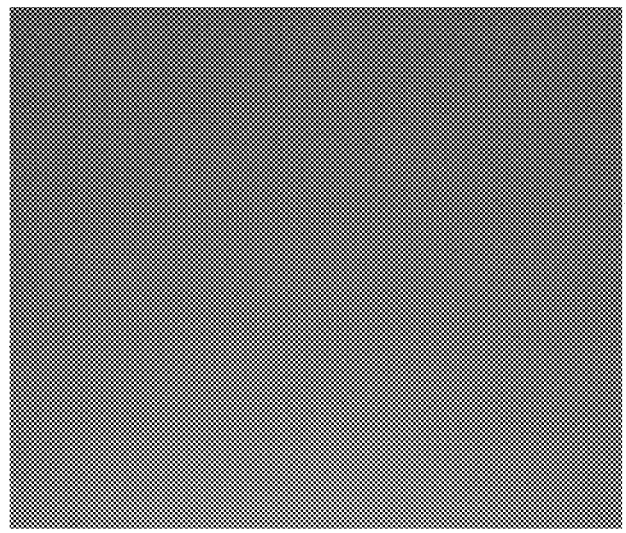
FIG. 3 is a projection image of a film according to an embodiment of the present disclosure.
Figure 4:
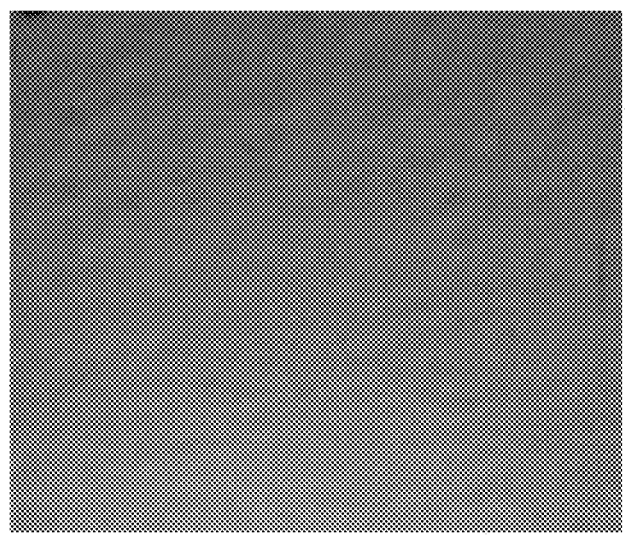
FIG. 4 is a projection image of a film according to Comparative Example.

FIG. 3 is a projection image of a film according to Example 1 of the present disclosure, and FIG. 4 is a projection image of a film according to Comparative Example 15. As can be seen from FIGS. 3 and 4, the polyimide-based film having a low Kc value of 1.55 or less produced according to Examples of the present disclosure has better surface evenness and little or no unevenness such as a wave pattern, compared to the polyimide-based films produced according to Comparative Examples.

The polyimide-based films according to embodiments of the present disclosure can be applied to various electronic devices. Accordingly, another embodiment of the present disclosure provides an electronic device including the polyimide-based film according to the present disclosure. The polyimide-based film according to the present disclosure may be applied as, for example, a cover window of an electronic device.

DESCRIPTION OF REFERENCE NUMERALS

10: Light source
20: Light
30: Film to be projected
40: Flat surface
50: Projected image

The invention claimed is:

1. A polyimide-based film having a Kc value of 1.55 or less,
wherein the polyimide-based film is produced by:
preparing a liquid resin composition using monomer components including dianhydride and diamine,
producing a gel-state film using the liquid resin composition,
first drying the gel-state film at a temperature of 50 to 150° C. at a wind speed of 0 m/s or less for a drying period of 2 to 20 minutes, and
second drying the gel-state film at a wind speed of 1.0 to 5.0 m/s at 70 to 140° C. after the first drying,
wherein the Kc value is a curvature parameter measured for a waviness having a wavelength range of 1.0 to 3.0 mm by phase stepped deflectometry, wherein a polyimide-based film sample having a width of 15 cm×a length of 15 cm×thickness of 80 μm is used for measuring K, and a measuring device is in a curvature mode K with 1.0 to 3.0 mm wavelength range, and a sheet of black matte paper is placed on a surface plate in a dark room, the sample to be measured is placed thereon, the Kc value is measured 10 times, and the average value is used as the Kc value of the sample, wherein the polyimide-based film is produced from monomer components including dianhydride and diamine, the dianhydride comprises at least one selected from 2,2-bis(3,4-dicarboxyphenyl)hexafluoropropane dianhydride, 3,3',4,4'-biphenyl tetracarboxylic dianhydride, 4-(2,5-dioxotetrahydrofuran-3-yl)-1,2,3,4-tetrahydronaphthalene-1,2-dicarboxylic anhydride, pyromellitic dianhydride, 3,3',4,4'-benzophenone tetracarboxylic dianhydride, 4,4'-oxydiphthalic anhydride, 4,4'-(3, 4-bisdicarboxyphenoxy-diphenyl sulfide dianhydride, 3,3',4,4'-diphenylsulfonetetracarboxylic dianhydride, 4,4'-(4,4'-Isopropylidenediphenoxy)bis(phthalic anhydride), cyclobutane-1,2,3,4-tetracarboxylic dianhydride, 1,2,3,4-cyclopentane-tetracarboxylic dianhydride, 1,2,4,5-cyclohexanetetracarboxylic dianhydride, and dicyclohexyl-3,4,3',4'-tetracarboxylic dianhydride, the diamine comprises at least one selected from 3,4-oxydianiline, 4,4'-oxydianiline, p-phenylenediamine, m-phenylenediamine, 4,4-methylenedianiline, 3,3-methylenedianiline, 1,3-Bis(3-aminophenoxy)benzene, 1,3-Bis(4-aminophenoxy)benzene, 2,2'-bis[4-(4-aminophenoxy) phenyl] hexafluoropropane, 2,2'-bis(3-aminophenyl)hexafluoropropane, 2,2'-bis(4-aminophenyl) hexafluoropropane, bis(4-aminophenyl)sulfone, bis(3-aminophenyl)sulfone, 2,2'-bis(trifluoromethyl) benzidine, 1,3-cyclohexanediamine, 1,4-cyclohexanediamine, 2,2-bis[4-(4-aminophenoxy)phenyl]propane, 2,2-bis(3-amino-4-hydroxyphenyl)hexafluoropropane, bis[4-(4-aminophenoxy)phenyl] sulfone, bis[4-(3-aminophenoxy)phenyl] sulfone, 9,9-bis(4-aminophenyl) fluorene and 9,9-bis(4-amino-3-fluorophenyl)fluorene.

2. The polyimide-based film according to claim 1, wherein the polyimide-based film has a Kc value of 1.45 or less.

3. The polyimide-based film according to claim 1, wherein the polyimide-based film has a Kc value of 1.10 to 1.45.

4. The polyimide-based film according to claim 1, wherein the monomer components further comprise a dicarbonyl compound.

5. The polyimide-based film according to claim 4, wherein the dicarbonyl compound comprises at least one of an aromatic dicarbonyl compound and an aliphatic dicarbonyl compound.

6. The polyimide-based film according to claim 5, wherein the aromatic dicarbonyl compound is represented by the following Formula 1:

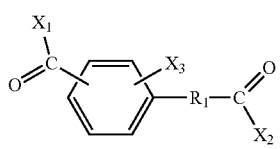

[Formula 1]

wherein $R_1$ represents a single bond, *—Ar—*, *—O—Ar—*, *-CAL-*, or *—O-CAL-*;

$X_1$ and $X_2$ each independently represent hydrogen, a hydroxy group (OH) or a halogen element; and $X_3$ represents hydrogen or a halogen element, wherein "Ar" represents a substituted or unsubstituted arylene group, and "CAL" represents a divalent cycloaliphatic group.

7. The polyimide-based film according to claim 5, wherein the aromatic dicarbonyl compound comprises at least one of a compound represented by the following Formula 3, a compound represented by the following Formula 4, a compound represented by the following Formula 5, a compound represented by the following Formula 6, a compound represented by the following Formula 7, a compound represented by the following Formula 8 and a compound represented by the following Formula 9:

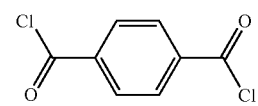

[Formula 3]

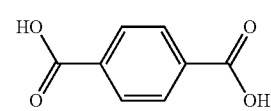

[Formula 4]

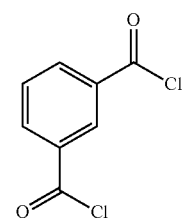

[Formula 5]

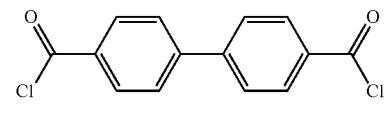

[Formula 6]

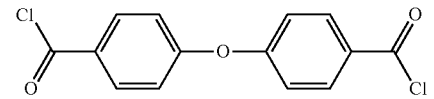

[Formula 7]

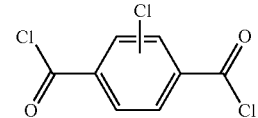

[Formula 8]

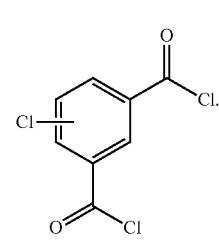

[Formula 9]

8. The polyimide-based film according to claim 5, wherein the aliphatic dicarbonyl compound comprises at least one of a compound represented by the following Formula 10, a compound represented by the following Formula 11, a compound represented by the following Formula 12, and a compound represented by the following Formula 13:

[Formula 10]
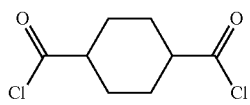

[Formula 11]
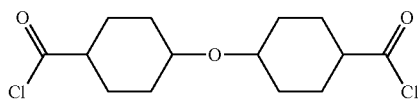

[Formula 12]
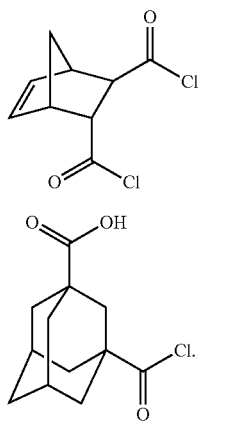

[Formula 13]

9. The polyimide-based film according to claim 1, wherein, based on a thickness of 80 μm, the polyimide-based film has a haze of 2.0 or less, an average optical transmittance of 87% or more at a wavelength of 380 to 780 nm, and a yellow index of 5 or less.

10. A method of producing a polyimide-based film comprising:
  preparing a liquid resin composition using monomer components including dianhydride and diamine;
  producing a gel-state film using the liquid resin composition;
  first drying the gel-state film at a temperature of 50 to 150° C. at a wind speed of 1.0 m/s or less for a drying period of 2 to 20 minutes; and
  second drying the gel-state film at a wind speed of 1.0 to 5.0 m/s at 70 to 140° C. after the first drying,
  wherein, in the first drying, the drying coefficient conditions according to the following Equations 1 and 2 are satisfied when the temperature is A° C., the wind speed is B m/s and the drying period is T minutes:

$$0.5 \leq [(A-40) \times B \times T]/100 \leq 10 \quad \text{[Equation 1]}$$

$$2 \leq [(A-40) \times T]/100 \leq 10. \quad \text{[Equation 2]}$$

11. The method according to claim 10, wherein the monomer components further comprise a dicarbonyl compound.

12. The method according to claim 10, wherein the liquid resin composition has a viscosity of 1,000 to 250,000 cPs.

13. The method according to claim 10, wherein the wind speed in the first drying is 0.2 m/s or more.

14. The method according to claim 10, further comprising first heat-treating the gel-state film for 1 minute to 1 hour at a temperature of 100 to 500° C. after the second drying.

15. The method according to claim 10, wherein the production of the gel-state film comprises casting the liquid resin composition on a support.

16. The method according to claim 10, wherein the preparation of the liquid resin composition comprises:
  reacting the monomer components in the presence of a first solvent to prepare a first polymer solution;
  adding a second solvent to the first polymer solution, followed by filtering and drying, to prepare a polymer solid; and
  dissolving the polymer solid in a third solvent.

* * * * *